United States Patent [19]

Gross

[11] 4,137,392
[45] Jan. 30, 1979

[54] CARBOXYLATED VINYL PYRROLIDONE COPOLYMERS

[75] Inventor: Bill B. Gross, Stow, Ohio

[73] Assignee: The Goodyear Tire & Rubber Company, Akron, Ohio

[21] Appl. No.: 868,258

[22] Filed: Jan. 10, 1978

[51] Int. Cl.$^2$ .................. C08F 212/08; C08F 220/12; C08F 226/10
[52] U.S. Cl. ............................ 526/224; 260/29.6 TA; 428/463; 526/264; 528/485; 528/487
[58] Field of Search ....................... 526/264, 224, 317; 528/487, 485

[56] References Cited

U.S. PATENT DOCUMENTS

| | | | |
|---|---|---|---|
| 3,044,873 | 7/1962 | Haas | 526/264 |
| 3,725,122 | 4/1973 | Reinhard et al. | 526/317 |
| 3,763,120 | 10/1973 | Atkins | 526/317 |

*Primary Examiner*—Harry Wong, Jr.
*Attorney, Agent, or Firm*—D. B. Little

[57] ABSTRACT

Copolymers of at least two acrylate monomers such as isobutyl methacrylate and 2-ethylhexyl acrylate, an organic acid or acid anhydride, and N-vinyl-2-pyrrolidone are prepared by emulsion polymerization. The polymer is then coagulated and dried, and dry resin is mixed with a water miscible coalescing solvent and a volatile amine. The amine-treated resin is water reducible and when used as a coating resin produces coatings of unusual water resistance and adhesion to metal surfaces.

8 Claims, No Drawings

CARBOXYLATED VINYL PYRROLIDONE COPOLYMERS

BACKGROUND OF THE INVENTION

This invention is in the field of coatings, in particular, water reducible coatings. For purposes of this application, a water reducible coating is defined to be a colloidal dispersion in an organic solvent and water whose resin concentration can be reduced with water or solvent, which when reduced with a coalescing solvent forms a durable coating when applied to a substrate surface. Other names applied to water reducible coatings are waterborne, water solubilized, and water-dilutable. This application relates to a particular resin formulated to be water reducible and to give good adhesion and water resistance to the final coating.

A majority of the coating resins commercially used today, are insoluble in water. Therefore, in general practice they have been dissolved in a suitable organic solvent or dispersed in water with the aid of emulsifying or surfactant agents in order to provide a coating composition suitable for application. A serious disadvantage of organic solvent solutions is their inherent potential toxicity, flammability, and environmental pollution.

The Clean Air Act of 1970 constitutes the basis of air pollution control regulations. It provided that the Environmental Protection Agency should issue National Ambient Air Standards, which has been done. These standards provide for limitations on particulate matter, sulfur dioxide, carbon monoxide, oxides of nitrogen, hydrocarbons, and photochemical oxidants. The last two of these, arising from coating solvents, are the major concerns to the coating industry. Many state implementation plans under the Clean Air Act have followed the general framework of Rule 66, which was adopted by Los Angeles County, California in 1966 and which greatly limits these latter two contaminants.

These regulations are generally addressed to the users of coatings rather than the manufacturer. Coatings manufacture can in general be conducted with little or no emission of solvents into the atmosphere, but the application and curing of these coatings on finished products such as automobiles and refrigerators require the evaporation of large amounts of solvent and thus fall under these regulations.

The most common systems being developed by coatings companies to meet these regulations are waterborne, powder, electrodeposition, high solids, conforming solvents, and polymer-monomer blends for ultraviolet light cure type of coatings. It is expected that water reducible or waterborne coatings will have a major share of the coatings market in the future. Although very few waterborne coatings are devoid of organic solvents, several of the state regulations have exempted water-thinned coatings which contain 20 percent or less volatile nonexempt material.

Aqueous dispersion or latex-type coatings contain high molecular weight polymers dispersed as an emulsion in an aqueous medium. Generally, acrylic latex coatings exhibit excellent toughness, good chemical and water resistance and excellent durability. However, the use in industrial coatings has been limited because of certain disadvantages (external thickener required for viscosity control, poor pigment dispersability, low gloss, foaming, complex formulation, and substrate wetting problems). Also, such water dispersions, when used to prepare coatings, generally require additional hardeners to overcome residual emulsifiers and curatives to crosslink the resin where water insoluble coatings are desired. Otherwise, such coatings prepared from a water dispersion would simply bleed away with a water wash.

On the other hand, water reducible polymers can be considered to be ultrafine particles of a molecular weight intermediate between that of emulsion polymers and true solutions. These polymers contain polar groups, which impart a degree of solubility. They are hybrids of emulsion polymers and solution polymers since they possess properties characteristic of both types. The affinity of the resin for water is controlled by the extent of solvation of the polar groups (carboxylic acid moieties in the case of acrylic polymers) in the polymer backbone. Solvation is achieved by pH adjustment and/or the addition of a water miscible polar cosolvent. Water reducible resins can be alkali soluble (containing acidic groups), acid soluble (containing basic groups), or nonionic (containing amide or hydroxyl groups in conjunction with either acid or basic components). The resins of this invention are of the alkali-soluble type.

Coatings made from the water-reducible resins have advantages over emulsion type coatings. They have better flow and leveling characteristics. Pigment dispersibility is easier. Formulation of the coating composition is not as complex, and gloss of the final coating is higher. Another important benefit of the water reducible type of coating is that it may be formed without substantial amounts of surfactant or emulsifying agents, which in large amounts can inhibit the physical properities of the final coating.

Representative of the types of resins presently utilized in water reducible coatings are: alkyd, styrene acrylics, acrylics, and polyesters. This invention is concerned with the acrylic type of resin. Two U.S. patents on the subject of acrylic water reducible resins are: U.S. Pat. No. 3,862,071 (acrylate-acrylic acid copolymer and metallic flake pigment) and U.S. Pat. No. 3,904,569 (aqueous dispersion containing a carboxylic acid-containing resin and an aliphatic polyamine). Acrylic water reducible resins having both hard and soft segments and to which a plasticizer is added are disclosed in U.S. Pat. No. 4,064,092, of which there are two divisional applications (Ser. No. 827,169 and U.S. Pat. No. 4,097,440 both filed Aug. 23, 1977).

Adhesion and water resistance have been problems with water reducible resins. Such resins have an affinity for water and coatings derived from them swell upon contact with water. Adhesion may be improved by the addition of plasticizer (e.g. a compatible phthalate), but some plasticizers can be extracted with water or soapy water.

There are various monomers which are known adhesions promoters: vinyl pyridine, methacrylic acid, dimethyl amino ethyl methacrylate, and isobutoxymethacrylamide. N-vinyl-2-pyrrolidone is known to be a hydrophilic, adhesion promoting monomer. It is known that when N-vinyl-2-pyrrolidone comprises 1 to 20 percent of the monomeric units in a polymer, it can confer characteristics such as strength, dye receptivity and hardness to the polymer. It is also known that N-vinyl-2-pyrolidone can modify water-swelling equilibrium, melting point, dielectric properties or surface activity. Vinyl pyrrolidone copolymers are also known to give smooth, continuous films with good hardness, stiffness and grease resistance properties.

The research and development which led to this invention were part of an effort to obtain water reducible acrylate coating resins with unusually good adhesion to metal surfaces and water resistance to prevent powdering and cracking. It has been found that the incorporation of from about 0.5 to about 5 percent N-vinyl-2-pyrrolidone into a specific class of acrylate polymers achieves this object better than the other adhesion promoters which were tested.

SUMMARY OF THE INVENTION

A resin is provided which is suitable for use in a water reducible composition, which resin comprises, based on 100 weight percent of monomeric units within the polymer: (A) from 0 to about 97 percent of at least two acrylate monomers selected from the group consisting of methyl acrylate, ethyl acrylate, 2-ethylhexyl acrylate, lauryl acrylate, isodecylmethacrylate, 2-ethylhexyl methacrylate, butyl acrylate, butyl methacrylate, and isobutyl methacrylate; (B) from 0 to about 95 percent of a monomer selected from the group consisting of styrene, alpha-methylstyrene, acrylonitrile, vinyl toluene, methyl methacrylate, vinyl chloride, and vinylidene chloride; (C) from about 0.5 to about 5 percent N-vinyl-2-pyrrolidone; and (D) from about 2 to about 15 percent of an unsaturated carbonyl compound selected from the group consisting of acrylic acid, methacrylic acid, fumaric acid, itaconic acid, maleic acid and maleic anhydride, with the proviso that the total percent of monomeric units must be 100 percent. Generally, harder coatings are produced from resins containing monomers from Group (B), such as styrene 20–30 percent with 60 to 75 percent of two monomers from Group (A).

The resins of this invention can be produced by reaction of the monomers in an aqueous emulsion medium. The principles of emulsion polymerization are discussed in the following references: *Synthetic Rubber,* WHITBY G. S., ed., John Wiley & Sons, 1954, Ch. 8; *Emulsion Polymerization,* Bovey FA, et al., Vol. IX of *High Polymers,* Interscience Publishers, Inc., 1955; and U.S. Pat. No. 3,714,122, col. 5, lines 41–67 and col. 6, lines 11–59.

Emulsion polymerization generally is well understood in the art. The polymerization reaction between the monomers is carried out in the finely divided monomer droplets obtained by mechanical stirring under the action of emulsifiers or surfactants which form a film around these droplets. The emulsifiers agglomerate to form micelles into which both the monomers and the catalysts diffuse. The soap or emulsifier micelle is the locus of polymerization during the initial stages. Free radical catalysts are used, and pH and temperature are controlled during the reaction. The pH can simply be adjusted with an inorganic base such as a base selected from sodium hydroxide, potassium hydroxide and ammonium hydroxide. Reaction temperature usually ranges between 5° and 80° C. Modifiers such as mercaptans and divinylbenzene are often used to control polymer chain growth or average molecular weight.

In the synthesis of the resins of this invention the monomers are mixed with water, surfactants, chelating agents, modifier, and a free radical catalyst. These ingredients are mixed and reacted at approximately 52° C., pH of from 2 to 7 (preferably 2.5 to 6), and for a time of between 8 and 16 hours.

The resins of this invention may be recovered by coagulation techniques which are common in the emulsion polymerization industry. Depending upon the character of the resin a proper coagulant and proper coagulating conditions are chosen. The reaction product mixture (after possible removal of unreacted monomer by steam stripping or other suitable technique) is mixed with a coagulant in water with agitation in order to form a slurry of resin particles. The resin slurry thus obtained may be filtered and the filter cake dried in conventional resin processing equipment. In experimental work for this invention, coagulations were done with a mixture of aluminum sulfate and sulfuric acid in water at a temperature ranging from about 60° C. to 85° C., and the resin was dried in air at about 60° C.

A film-forming water reducible composition is prepared using a mixture of the resin with a suitable coalescing solvent and a volatile amine. The starting material for this mixture is preferably the dried resin described above; however, the emulsion reaction product from the resin formation reaction can be used directly without intermediate coagulation and drying steps. In such an operation, the composite would automatically be in a water reduced form, when sufficient amine is used.

Suitable coalescing solvents are those having affinity for both the resin polymer and water (e.g. alcohols, glycol ethers, and ketones). The suitable solvents have a higher boiling point than water so that they are the last solvents to leave the applied coating. In the water reducible composition, the resin and the coalescing solvent are generally mixed in a ratio of 100 parts by weight resin to from 30 to about 150 parts by weight of coalescing solvent.

The mixture is actually made water reducible by neutralizing the carboxyl groups of the resin with a suitable volatile amine. The amine, or any volatile base, is added to the resin solvent mixture. It is the neutralized carboxylic acid groups which give the resin affinity for water and actually suspend the resin between both the solvent phase and the water phase. The amine is selected from primary, secondary, and teritary amines having a melting point in the range of about −40° C. to about 25° C. and a boiling point in the range of about 50° C. to about 150° C. After the amine is added water may be added as solvent, generally in the range of about 100 to about 300 parts by weight water per 100 parts by weight neutralized resin. The water/solvent weight ratio should be approximately 80/20. When water is added, a stable dispersion is formed having a pH of about 8 to about 14.

The actual mechanism of water reducible resins is not thoroughly understood; however, a substantially water insoluble coating is provided on a substrate by application of a coating composition of this invention and drying the applied coating to remove the water, amine, and coalescing solvent. Application is by any of the conventional techniques such as brushing or spraying. The thickness of the applied coating should generally be in the range of about 1 to about 30 mils (0.025–0.762mm), preferably from about 1 to about 5 mils (0.025–0.13mm). Typical uses for coatings of this type are metal decorative coatings, highly pigmented coatings such as basement sealers and metal can coatings.

The resins may also be used in printing inks. In printing inks, the proportion of unsaturated carbonyl compound (e.g. methacrylic acid) would be relatively high (10–15%) to impart more water solubility.

DESCRIPTION OF THE PREFERRED EMBODIMENTS

The coalescing solvent is generally selected from the group consisting of ethylene glycol monomethyl ether, ethylene glycol monoethyl ether, ethylene glycol monobutyl ether, diethylene glycol monobutyl ether, diethylene glycol monoethyl ether acetate, diethylene glycol diethyl ether, ethylene glycol monomethyl ether acetate, methyl ethyl ketone, acetone, methyl propyl ketone and diacetone alcohol. Of the various solvents which can be used, generally the ethylene glycol monobutyl ether, ethylene glycol monoethyl ether, diethylene glycol monomethyl ether, diethylene glycol monoethyl ether and diethylene glycol monobutyl ether are preferred.

Representative of the various amines which may be used to form the water reducible compositions are: primary amines such as ethyl amine, propyl amine, butyl amine, isoamyl amine, amyl amine, hexyl amine, heptyl amine and ethanol amine; secondary amines such as diethyl amine, ethyl ethanol amine, and morpholine; and tertiary amines such as dimethylethanol amine, trimethyl amine, triethylamine and N-methyl morpholine.

The amount of water used depends on whether a high or a low viscosity dispersion is desired or whether high or low solids content is desired. It also depends on the type and amount of coalescing solvent used.

The water, amine and coalescing solvent are evaporated from applied coatings usually at a temperature in the range of about 20° C. to about 100° C., preferably about 25° C. to about 50° C.

The resins which are preferred for use in water reducible compositions are those requiring the least number of monomers for their synthesis. This, of course, simplifies the manufacture of the resins.

The invention will be further clarified by a consideration of the following examples, which are intended to be purely exemplary of the use of the invention. Unless otherwise stated, parts are parts by weight, and percentages are by weight.

EXAMPLE I

Polymerizations were carried out in one quart (0.95 liter) glass bottles which were clamped in a rotating wheel-polymerizer. The wheel of this polymerizer was located in a water bath held at 52° C. Each bottle was charged with the ingredients, purged with nitrogen, and capped with a perforated cap having a rubber disc seal through which a hypodermic needle could be inserted for the taking of samples. Two bottles were run for each recipe. The percent conversion for a given polymerization time was determined by measuring total percent solids of the sample at that time and estimating conversion from a total solids-conversion straight line relationship. The total solids was determined by drying a weighed sample of the latex in a weighed aluminum dish by means of an infrared lamp until the sample appeared to be dry. The bottle polymerizations ran approximately to completion. Reaction ingredients, conditions, and final product characteristics are given in Table 1.

Table 1

| EMULSION POLYMERIZATION OF ACRYLIC RESINS | | | |
|---|---|---|---|
| SAMPLE NO. INGREDIENTS (in parts) | 406C | 447A | 447B |
| Water | 151.0 | 151.0 | 151.0 |

Table 1-continued

| EMULSION POLYMERIZATION OF ACRYLIC RESINS | | | |
|---|---|---|---|
| SAMPLE NO. INGREDIENTS (in parts) | 406C | 447A | 447B |
| *Emulsifier | 3.0 | 3.0 | 3.0 |
| Metal Complexing Agent | 0.1 | 0.1 | 0.1 |
| Sodium Acid Pyrophosphate | 0.2 | 0.2 | 0.2 |
| $K_2S_2O_8$ (free radical catalyst) | 0.1 | 0.1 | 0.1 |
| Tert.-Mercaptan | 0.8 | 0.8 | 0.8 |
| Isobutyl Methacrylate | 71.0 | 42.0 | 40.0 |
| 2-Ethylhexyl methacrylate | 24.0 | 28.0 | 27.0 |
| Styrene | — | 25.0 | 25.0 |
| N-vinyl-2-pyrrolidone | 2.0 | 2.0 | 5.0 |
| Methacrylic acid | 3.0 | 3.0 | 3.0 |
| Final % Solids | 40.3 | 39.8 | 39.8 |
| Final pH | 2.7 | 6.1 | 6.0 |
| Final Viscosity (cps) | 22 | 30 | 25 |
| Reaction Time (hrs) | 12 | 12 | 12 |

*Complex surfactant phosphate ester acid neutralized with NaOH to pH = 6.5. Surfactant used herein was Gafac RE-410, a trademark of GAF Corporation.

EXAMPLE II

The resins produced in Example I above were separated from the reaction product mixtures by coagulation and drying. The duplicate bottles were blended together before coagulation. The coagulant in each case was a mixture of 6 grams alum (aluminum sulfate), 3 grams sulfuric acid (95–98%), and 4000 milliliters of water. The temperature of the coagulation is given in Table 2. The slurry resulting from each coagulation was filtered using a cloth-lined Buchner funnel. After filtration the resin cake was washed twice with cold soft water. The resin was then dried at 60° C. in an oven.

Table 2

| COAGULATION AND DRYING OF RESINS | | | |
|---|---|---|---|
| SAMPLE | 406C | 447A | 447B |
| Coagulation Temperature (° C) | 49–60 | 60 | 60 |

Film forming water reducible coating compositions can be prepared from resins such as those of Example II by mixing such a resin with a coalescing solvent generally at a temperature of from about 25° C. to about 80° C., and generally for a period of from about 20 to about 60 minutes. Sufficient volatile amine is added to achieve a pH in the final water dispersion in the range of about 8 to about 14. The water reduced compositions are formed by mixing about 330 parts of water with the amine neutralized compositions at a temperature of from about 25° C. to about 80° C. and for a period of from about 20 to about 60 minutes. Films formed by applying said coating compositions to substrates are generally dried for a period of from about 8 to about 24 hours.

Other embodiments of this invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A resin, suitable for use in a water reducible composition which comprises, based on 100 weight percent of monomeric units within the resin:
    (A) from about 60 to about 75 percent of at least two acrylate monomers selected from the group consisting of methyl acrylate, ethyl acrylate, 2-ethylhexyl acrylate, lauryl acrylate, 2-ethylhexyl methacrylate, butyl acrylate, isodecyl methacrylate, butyl methacrylate, and isobutyl methacrylate;
(B) from about 20 to about 30 percent styrene
(C) from about 0.5 to about 5 percent N-vinyl-2-pyrrolidone; and
(D) from about 2 to about 15 percent of an organic acid selected from the group consisting of acrylic acid, and methacrylic acid.

2. The resin as recited in claim 1 which comprises from about 40 to about 42 percent isobutyl methacrylate; from about 27 to about 28 percent 2-ethylhexyl methacrylate; 25 percent styrene; from about 2 to about 5 percent N-vinyl-2-pyrrolidone and about 3 percent methacrylic acid.

3. The process of synthesizing the resin of claim 1 which comprises reacting monomers selected from the following groups and in the following proportions:
(A) from about 60 to about 75 parts of at least two acrylate monomers selected from the group consisting of methyl acrylate, ethyl acrylate, 2-ethylhexyl acrylate, lauryl acrylate, 2-ethylhexyl methacrylate, butyl acrylate, isodecyl methacrylate, butyl methacrylate, and isobutyl methacrylate;
(B) from about 20 to about 30 parts styrene;
(C) from about 0.5 to about 5 percent N-vinyl-2-pyrrolidone; and
(D) from about 2 to about 15 percent of an organic acid selected from the group consisting of acrylic acid and methacrylic acid in an aqueous emulsion medium wherein the monomers are mixed with water, surfactants, chelating agents, modifier, and a free radical catalyst and wherein this mixture is reacted at a temerature of approximately 52° C., a pH of from 2 to 7, and for a time of between 8 and 16 hours.

4. The process as recited in claim 3 wherein the reaction mixture comprises about 151 parts water, about 3 parts emulsifier, about 0.1 parts complexing agent, about 0.2 parts sodium acid pyrophosphate, about 0.1 parts potassium persulfate; about 0.8 parts mercaptan modifier and about 100 parts total monomer.

5. The process as recited in claim 4 which further comprises the steps of coagulating the reaction product mixture after the reaction is complete, filtering the resin slurry from the coagulation step and drying the filter cake.

6. The process as recited in claim 5 wherein the coagulant comprises a mixture of water, alum and sulfuric acid.

7. A resin, suitable for use in a water reducible composition which comprises a copolymer consisting essentially of 71 percent isobutyl methacrylate, 24 percent 2-ethylhexyl methacrylate, 2 percent N-vinyl-2-pyrrolidone and 3 percent methacrylic acid.

8. The process of synthesizing the resin of claim 1, which comprises reacting 71 parts isobutyl methacrylate, 24 parts 2ethylhexyl methacrylate, 2 parts N-vinyl-2-pyrrolidone and 3 parts methacrylic acid together by mixing them with 151 parts water, 0.3 parts emulsifier, 0.1 part metal complexing agent 0.2 part sodium acid pyrophosphate, 0.1 part potassium persulfate, and 0.8 part tertiary mercaptan at a temperature of about 52° C., a pH of about 2 to 7, and for a time of between 8 and 16 hours.

* * * * *